(12) United States Patent
Mologni

(10) Patent No.: US 10,357,856 B2
(45) Date of Patent: Jul. 23, 2019

(54) APPARATUS FOR PLATE PUNCHING AND LASER CUTTING

(71) Applicant: PRODUTECH S.r.l., San Paolo d'Argon (BG) (IT)

(72) Inventor: Fabrizio Mologni, San Paolo d'Argon (IT)

(73) Assignee: PRODUTECH S.R.L., San Paolo d'Argon (BG) (IT)

( * ) Notice: Subject to any disclaimer, the term of this patent is extended or adjusted under 35 U.S.C. 154(b) by 0 days.

(21) Appl. No.: 15/793,267

(22) Filed: Oct. 25, 2017

(65) Prior Publication Data

US 2018/0111234 A1  Apr. 26, 2018

(30) Foreign Application Priority Data

Oct. 25, 2016  (IT) .................. 102016000107541

(51) Int. Cl.
| | |
|---|---|
| B23P 23/02 | (2006.01) |
| B23P 23/04 | (2006.01) |
| B23K 26/00 | (2014.01) |
| B23K 26/38 | (2014.01) |
| B21D 28/26 | (2006.01) |
| B26D 7/27 | (2006.01) |
| B26D 7/18 | (2006.01) |

(Continued)

(52) U.S. Cl.
CPC .............. *B23P 23/02* (2013.01); *B21D 28/26* (2013.01); *B23K 26/0093* (2013.01); *B23P 23/04* (2013.01); *B26D 7/27* (2013.01); *B23K 26/38* (2013.01); *B23K 26/702* (2015.10); *B23K 2101/18* (2018.08); *B26D 7/1863* (2013.01); *B26D 2007/0018* (2013.01); *Y10T 29/5176* (2015.01)

(58) Field of Classification Search
CPC .............................. B23K 26/0093; B26D 7/27
See application file for complete search history.

(56) References Cited

U.S. PATENT DOCUMENTS 5,168,610 A * 12/1992 Ichimura ................ B21D 28/12
                                                           219/121.67
5,350,897 A    9/1994 Chun

FOREIGN PATENT DOCUMENTS

| JP | H06733 A | 1/1994 |
|---|---|---|
| JP | 2718512 B2 * | 2/1998 |

OTHER PUBLICATIONS

Machine Translation of JP 2718512 B2, which JP '512 was published Feb. 1998.*

(Continued)

*Primary Examiner* — Erica E Cadugan
(74) *Attorney, Agent, or Firm* — Hedman & Costigan, P.C.; James V. Costigan; Kathleen A. Costigan

(57) ABSTRACT

An apparatus for plate punching and laser cutting, characterized in that it comprises a bearing frame on which, on one machine front, a punching unit and a laser cutting unit are assembled; said punching unit comprising two punching heads, one overlapping the other, an upper head with punches and a lower head with cavities; said laser cutting unit comprises two laser cutting heads, one overlapping the other, an upper head with a laser cutting device, and a lower head with a support frame for the plate to be processed and fumes extraction assembly; each of said heads is set in motion in an independent manner along an axis transversal to the direction of forward movement of a plate to be processed.

5 Claims, 4 Drawing Sheets

(51) Int. Cl.
*B26D 9/00* (2006.01)
*B23K 101/18* (2006.01)
*B23K 26/70* (2014.01)
*B26D 7/00* (2006.01)

(56) References Cited

OTHER PUBLICATIONS

Italian Patent Office Search Report and Written Opinion dated Jun. 23, 2017 (partially in English).
English Abstract for JP H06733 A dated Jan. 11, 1994.

\* cited by examiner

APPARATUS FOR PLATE PUNCHING AND LASER CUTTING

BACKGROUND OF THE INVENTION

The present invention relates to an apparatus for plate punching and laser cutting.

There are known machines that carry out punching and laser cutting of a plate, in slugs or in coils, comprising a punching unit and a laser cutting unit.

There are also known machines that carry out both punching and laser cutting of a plate, but only from slugs (sheet) with sizes of a limited and definite length.

The punching units of prior art machines have bulky metal structures that join the functional components of the unit.

In conventional laser cutting units, fume extraction involves the whole area on which the sheet to be processed rests and consists of a fixed table with a bearing plane to support the plate with points, known as pin table ("letto di fachiro").

During the cutting, the laser device finds, under the plate, the points of the fixed table supporting the plate and, as the incandescent particles of the laser cut are not completely discharged, "burrs" form on the profile of the cut plate.

A further drawback of the structure with points, the pin table, supporting the plate consists of frequent replacements and frequent maintenance to clean the blades with the points, necessary due to the dross produced by the laser cut, which deposits on the points on which the plate rests and forms an irregular surface with differences in height that are detrimental to the quality of the cut.

Therefore, the bulky structures of which the punching unit and the pin table plane of the laser are composed prevent the interaction of the two processing technologies on a single machine fed by coils.

To complete the processing of a workpiece, with conventional machines, different processing operations must be carried out on different machines, resulting in logistics, storage, setup and labour costs.

SUMMARY OF THE INVENTION

The aim of the present invention is to produce an apparatus for plate punching and laser cutting that overcomes the problems of the prior art cited above.

Within this aim, an object of the invention is to provide an apparatus that has a compact size and offers extreme production flexibility, high movement speed and extreme processing precision.

Another object of the invention is to provide an apparatus equipped with a laser cutting unit without any fixed table with bearing plane supporting the plate with points, known as "pin table", thereby improving the quality of the cut and avoiding frequent replacements and maintenance to clean the blades with the points.

A further object of the invention is that of making the two punching and laser cutting units interact in a single machine fed by coils.

Yet another object of the present invention is to provide an apparatus capable of processing and producing workpieces of any size from the plate coming from the coil and therefore with a size having no length limits.

A further object of the invention is to provide an apparatus that allows workpieces to be produced with complete and complex processing operations on a single machine, automatically, without requiring to carry out different operations on different machines, avoiding logistical, storage, setup and labour costs.

These and other objects, which will become more apparent below, are achieved by an apparatus for plate punching and laser cutting, characterized in that it comprises a bearing frame on which, on one machine front, a punching unit and a laser cutting unit are assembled; said punching unit comprising two punching heads, one overlapping the other, an upper head with punches and a lower head with cavities; said laser cutting unit comprises two laser cutting heads, one overlapping the other, an upper head with a laser cutting device, and a lower head with a support frame for the plate to be processed and a fumes extraction assembly; each of said heads is set in motion in an independent manner along an axis transversal to the direction of forward movement of a plate to be processed.

BRIEF DESCRIPTION OF THE DRAWINGS

Further characteristics and advantages of the subject matter of the present invention will become more evident from examination of the description of a preferred, but not exclusive, embodiment of the invention, illustrated by way of non-limiting example in the accompanying drawings, wherein.

DESCRIPTION OF PREFERRED EMBODIMENT

Figure 1:
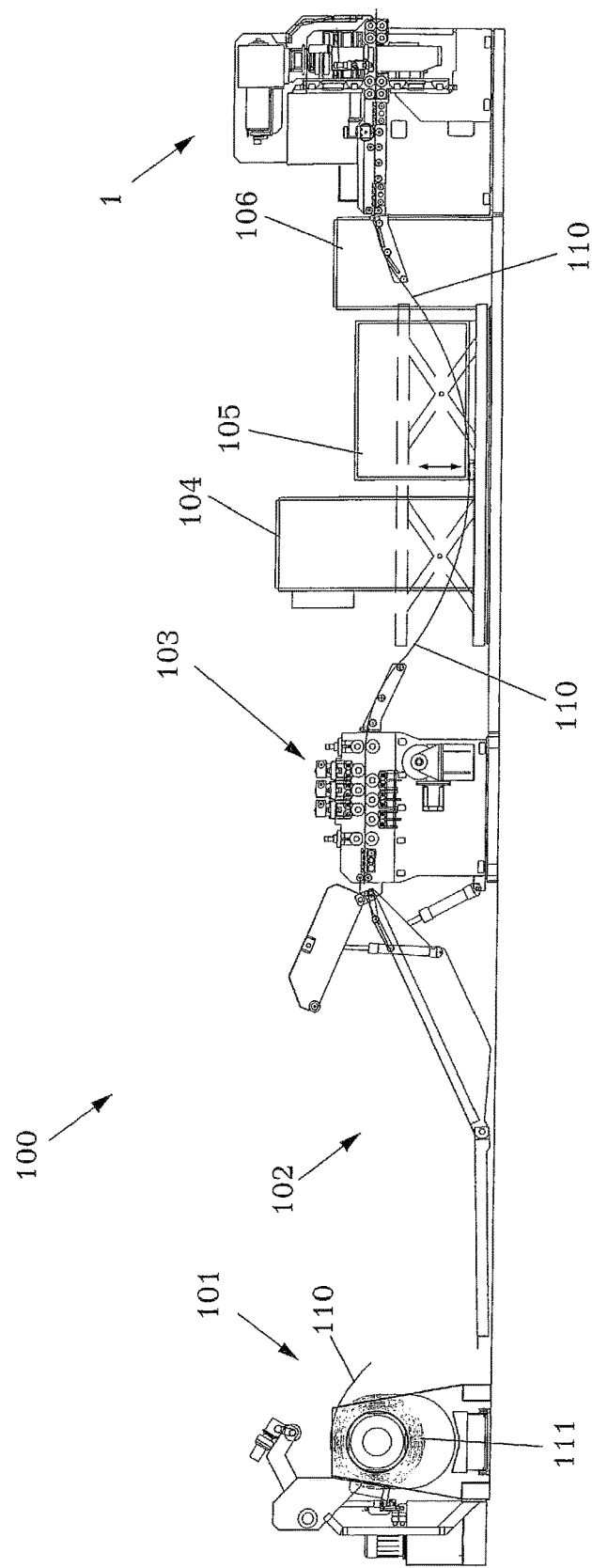
FIG. 1 is a side elevation view of a system for punching and for laser cutting of a plate in coil.
Figure 2:
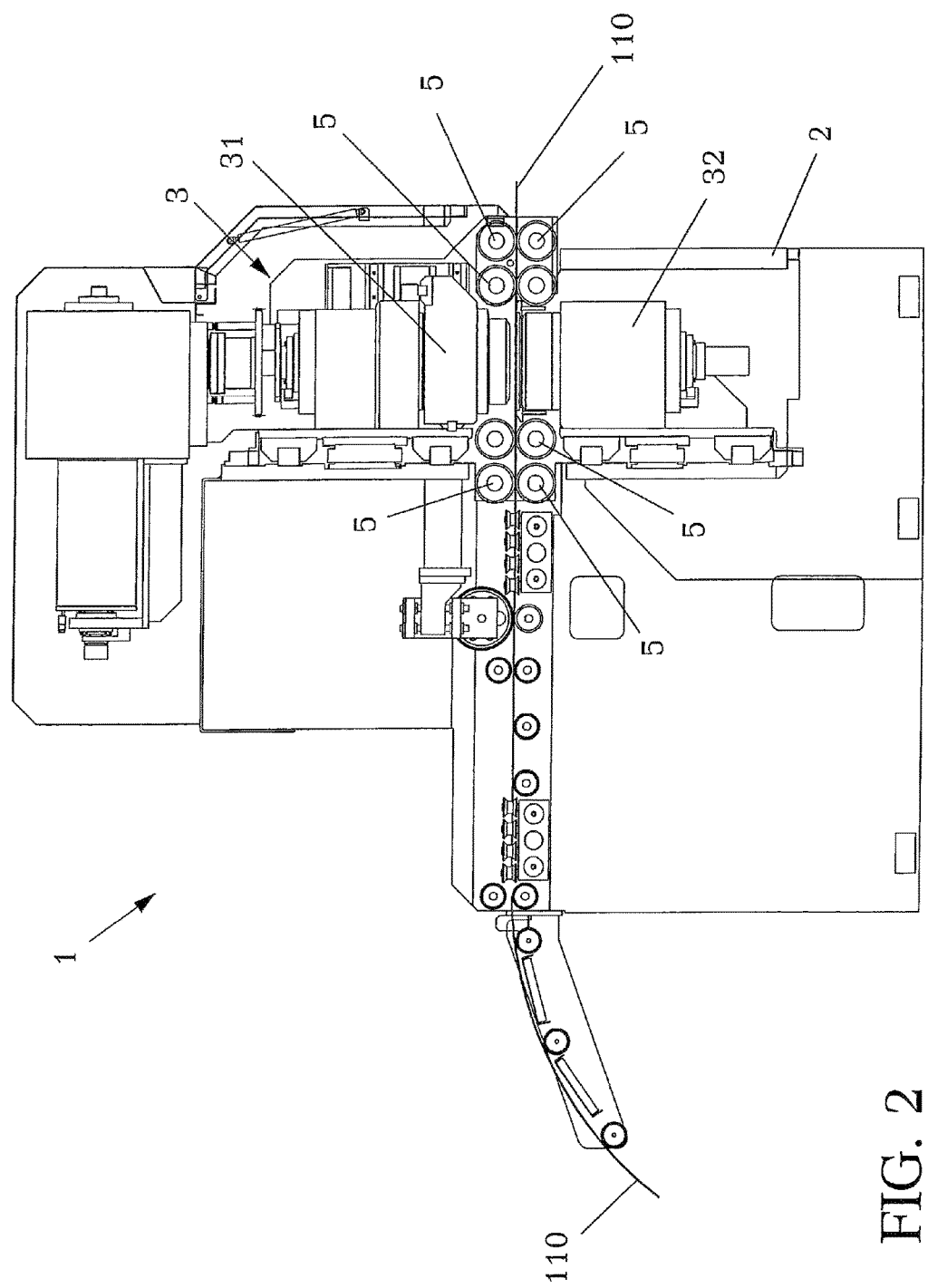
FIG. 2 is a side elevation view showing the side of the punching heads of the apparatus of the present invention.
Figure 3:
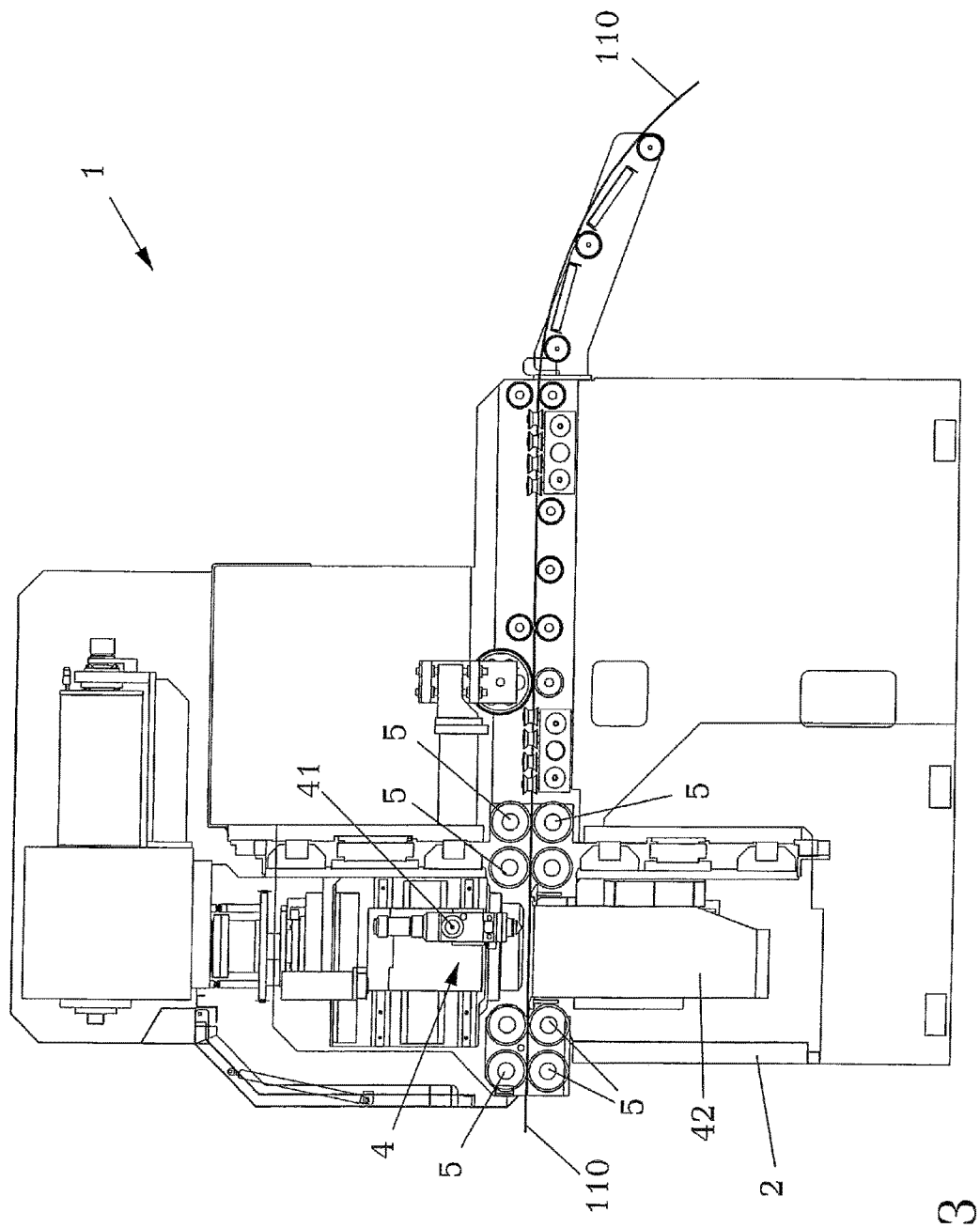
FIG. 3 is a side elevation view showing the side of the laser cutting heads of the apparatus of the present invention.
Figure 4:
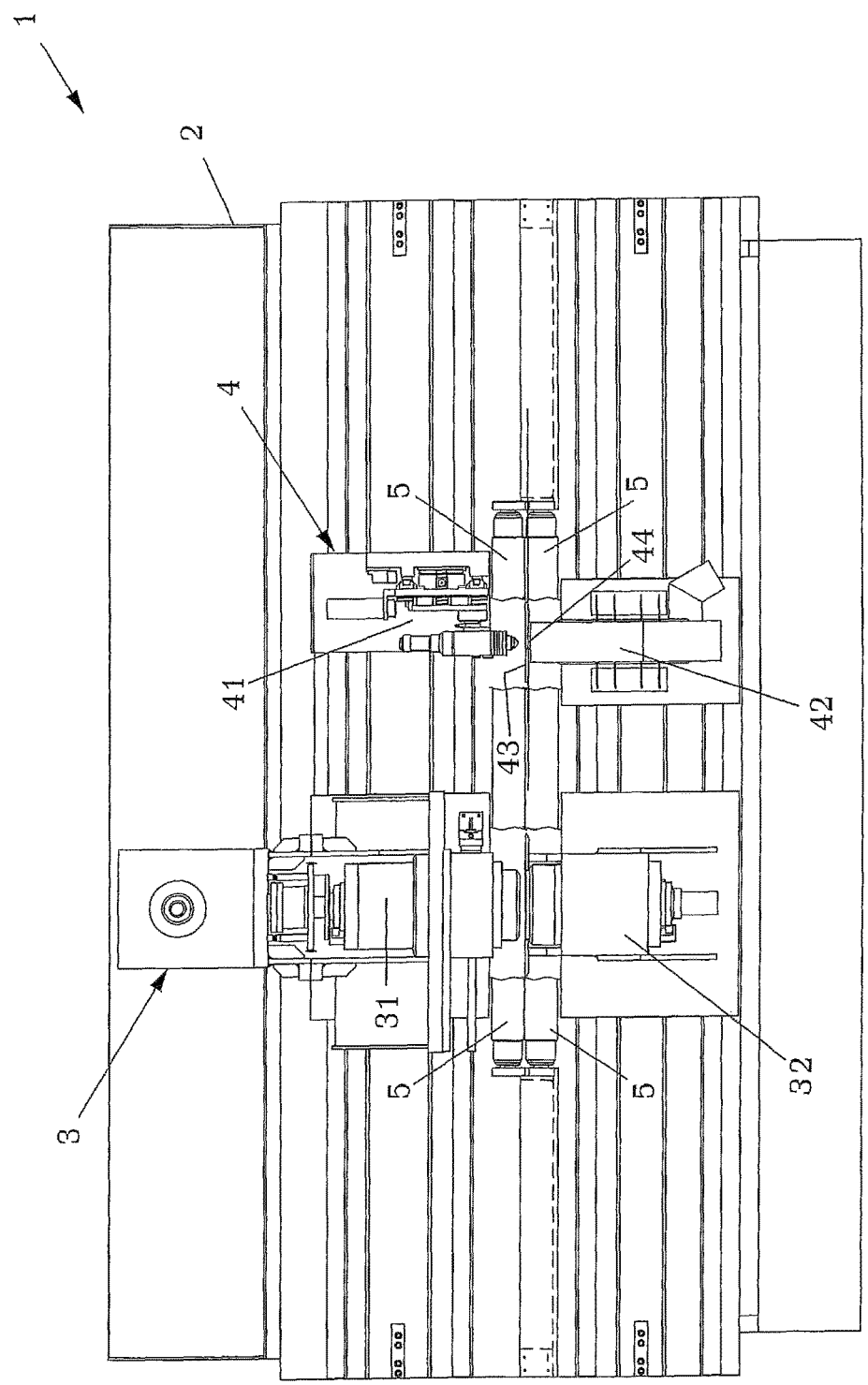
FIG. 4 is a front view of the apparatus of the present invention.

With particular reference to the numerical symbols of the aforesaid figures, the apparatus for plate punching and laser cutting according to the invention, indicated as a whole with the reference numeral 1, is inserted in a plant 100 comprising, upstream of the apparatus 1, an unwinder and presser 101, followed by a plate feeder device 102 that feeds the plate 110 to a straightener with counter-pressure rollers 103, which in turn feeds the apparatus 1.

The plant also comprises auxiliary apparatus such as an electrical panel 104, a fume extractor 105 and a laser source 106.

According to the present invention, the apparatus 1 comprises a bearing frame 2, on which, on one machine front, a punching unit 3 and a laser cutting unit 4 are assembled.

The punching unit 3 comprises two punching heads, one overlapping the other, an upper head 31 with punches and a lower head 32 with cavities.

The laser cutting unit 4 comprises two laser cutting heads, one overlapping the other, an upper head 41 with a laser cutting device, and a lower head 42 with a support frame for the plate to be processed and a fumes extraction assembly.

Each of the four processing heads is set in motion in an independent manner along the axis Y, i.e., transversal to the feeding direction of the plate being processed, by linear motors or by recirculating ball screws driven by brushless motors, and they move on hardened and ground precision guides with recirculating ball bearings and/or recirculating roll carriages The two punching heads 31 and 32 are aligned, one on top of the other, with extreme precision and move perfectly synchronised during the processing steps by linear motors, torque motors and/or brushless motors driving precision recirculating ball screws.

All the motors are controlled by suitable electronic drives, with movement detection by optical lines and high-resolution encoders.

The automatic processing or working cycle of the punching unit and of the laser cutting unit is managed by a powerful CNC connected to an operator panel (industrial PC), acting as an interface.

The two laser cutting heads 41 and 42 operate with the same method described above for the two punching heads 31 and 32.

The lower head 42 of the laser cutting unit consists of a small size metal structure having an upper bearing plane 43 to support the plate 110 being processed.

This bearing plane 43 has, in its central part, a hole 44, of variable size depending on the kind of job to carry out, which is needed to discharge the laser cut, as there must be nothing under the plate at the point in which the laser cut is carried out, and to draw the produced sparks and fumes.

Unlike the conventional punching machines available on the market, the two punching heads 31 and 32 are not joined to each other.

The two laser cutting heads 41 and 42 are both moving, chasing each other during cutting and for this reason are of very small size, unlike conventional machines available on the market which have a single moving head, positioned over the plate and housing the laser cutting unit, while under the plate they have a fixed table with blades with points, which are damaged by the laser and must be replaced periodically, on which the plate to be cut rests and with a size as large as required by the size of the workpiece to be processed. This large fixed table also acts as fume extraction chamber.

The apparatus according to the present invention comprises several pairs of overlapping rollers 5 driven by brushless motors and/or by torque motors, which allow the plate to advance along the axis X, coming directly from the coil 111 and therefore with an extremely ample size in length and/or from a slug having no length limits.

The punching and laser cutting units can be provided, with identical characteristics, also separately on distinct frameworks: one framework bearing only the punching units and one framework bearing only the laser cutting units.

It has in practice been found that the invention achieves the intended aim and objects.

In fact, an apparatus for plate punching and laser cutting has been provided which offers various and considerable advantages compared with conventional machines.

According to the present invention, unlike conventional punching machines, the punching unit has no bulky metal structures that join the various components and has a compact size.

The components of the punching unit of the present invention can move over (head with the punches) and under (head with the cavities) the plate to be processed with a very high degree of freedom, allowing limited size of the apparatus, extreme production flexibility, high movement speed (limited size and weight) and extreme precision (high mechatronic technology used).

The laser cutting unit of the present invention has two moving components of small size that operate synchronously.

The laser cutting head moves over the plate, in the same way as the head with punches, and is chased, under the plate, by the head consisting of the support frame of the same plate and the fumes extractor, in the same way as the head with cavities with respect to the punching head of the punching unit.

The moving lower head of the laser cutting unit has a central hole of limited size, which is aligned perfectly with the cutting tip of the laser head. Moreover, the presence of overlapping rollers that move forwards and backwards the plate, coming directly from the coil or from slugs (sheets) having no length limits, allows the two upper and lower laser cutting heads to move only transversally (axis Y) while the second axis of movement is provided by the movement of the plate (axis X). This allows discharge of the laser cut with related fumes and sparks into the extraction assembly of the lower head.

The extraction assembly is moving and chases the cutting unit and consequently has a very limited and compact size, regardless of the size of the workpiece to be cut. This results in improved extraction, as it is concentrated, unlike conventional laser machines in which fume extraction involves the whole area on which the sheet to be processed rests and which consists of a fixed structure with bearing plane to support the plate with points, known as "pin table".

The described configuration of the two processing units (punching and laser) allows interaction on a machine fed by coils or by slugs having no length limits.

Moreover, the present invention allows an improvement of the quality of the cut, as the laser cutting head, always finding the hole under the plate, and consequently an empty space instead of the points of the fixed plate support table, as occurs in conventional laser machines, allows improved discharge of the incandescent particles of the laser cut and consequently no burrs are formed on the profile of the cut plate.

The absence of the structure with points, the pin table, to support the plate also eliminates the need for frequent replacements and frequent maintenance to clean the blades with the points, required due to the dross generated by the laser cut, which deposits on the points on which the plate rests and forms an irregular surface with differences in height that are detrimental to the quality of the cut.

The configuration of the apparatus according to the present invention, having processing units that move transversal on the axis Y in an independent and synchronised manner and the plate moved longitudinally along the axis X, allows an extremely limited overall size to be achieved, together with the capacity to process and produce workpieces of any size from the plate coming from the coil and consequently having no length limits.

The punching units and the laser cutting units can operate alternately, in the same processing area, and therefore alternate punching and cutting operations on the same workpiece. While the punching units are operating, the laser cutting units are stored on the side of the machine. The same occurs when the laser cutting units are operating, with the punching units stored on the opposite side of the machine.

This solution allows workpieces to be produced with complete and complex operations on a single machine, automatically, without requiring to carry out different operations on different machines, avoiding logistics, storage, setup and labour costs.

Of course, the materials used and the sizes can be any, according to requirements.

The invention claimed is:

1. An apparatus for plate punching and laser cutting, comprising:
 a bearing frame on which a punching unit (3) and a laser cutting unit (4) are assembled;

said punching unit (3) comprising two punching heads which are arranged mutually overlapping, said two punching heads comprising an upper punching head (31) and a lower punching head (32);

said laser cutting unit (4) comprising two laser cutting heads which are arranged mutually overlapping, said two laser cutting heads comprising an upper laser cutting head (41), and a lower laser cutting head (42) for supporting a plate (110) to be processed, said laser cutting unit further comprising a fumes extraction assembly;

each of said two punching heads and said two laser cutting heads being adapted to be set in motion in a mutually independent manner along an axis transversal to a direction of movement of the plate to be processed.

2. An apparatus, according to claim 1, characterized in that said laser cutting lower head (42) consists of a metal structure having an upper bearing plane (43) to support said plate (110) being processed; said bearing plane (43) having, in its central part, a hole (44) for discharge of a laser cut and to draw produced sparks and fumes.

3. An apparatus, according to claim 2, characterized in that said laser cutting heads (41, 42) are both moving, chasing each other during the cutting.

4. An apparatus, according to claim 1, comprising pairs of overlapping rollers (5) for advancing the plate along an axis of said movement of the plate.

5. An apparatus, according to claim 1, comprising an automatic working cycle of said punching and laser cutting units.

\* \* \* \* \*